(12) United States Patent
Shirai et al.

(10) Patent No.: US 7,750,955 B2
(45) Date of Patent: Jul. 6, 2010

(54) IMAGE SIGNAL PROCESSING APPARATUS, IMAGE SIGNAL PROCESSING METHOD AND CAMERA USING THE IMAGE SIGNAL PROCESSING APPARATUS

(75) Inventors: Takahiro Shirai, Isehara (JP); Daisuke Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/212,636

(22) Filed: Aug. 29, 2005

(65) Prior Publication Data
US 2006/0044424 A1    Mar. 2, 2006

(30) Foreign Application Priority Data

Aug. 31, 2004   (JP)   ............................. 2004-252386
Nov. 26, 2004   (JP)   ............................. 2004-342128

(51) Int. Cl.
*H04N 9/64*   (2006.01)
(52) U.S. Cl. .................. 348/243; 348/241; 348/251
(58) Field of Classification Search ................. 348/243, 348/241, 251; 382/266–275
See application file for complete search history.

(56) References Cited

U.S. PATENT DOCUMENTS

| | | | | |
|---|---|---|---|---|
| 5,548,331 | A | * | 8/1996 | Kawahara et al. ........... 348/243 |
| 5,659,355 | A | * | 8/1997 | Barron et al. ............... 348/245 |
| 6,049,355 | A | | 4/2000 | Kameyama ................. 348/241 |
| 6,774,942 | B1 | * | 8/2004 | Salcedo et al. ............. 348/243 |
| 6,791,607 | B1 | * | 9/2004 | Bilhan et al. ............... 348/243 |
| 2006/0044424 | A1 | | 3/2006 | Shirai et al. ................ 348/241 |

FOREIGN PATENT DOCUMENTS

| | | |
|---|---|---|
| JP | 5-130450 | 5/1993 |
| JP | 5-344280 | 12/1993 |
| JP | 9-247552 | 9/1997 |
| JP | 2002-077738 | 3/2002 |
| JP | 2002-94797 | 3/2002 |
| JP | 2004-80168 | 3/2004 |
| JP | 2004-350104 | 12/2005 |

* cited by examiner

*Primary Examiner*—David L Ometz
*Assistant Examiner*—Antoinette T Spinks
(74) *Attorney, Agent, or Firm*—Fitzpatrick, Cella, Harper & Scinto

(57) ABSTRACT

When clamping a signal from a solid state image sensor, float of an optical black pixel output due to incoming of infrared light avoids a malfunction of a clamp from occurring. When clamping a signal from the solid state image sensor, the difference between the optical black pixel output and a clamp target level is output as a difference output, the difference output is compared with a comparison level to integrate the number of times larger than the comparison level every horizontal line. When the number of times is equal to or more than a certain rate (⅔) from the number of optical black pixels on the horizontal line, an optical black float state is determined and clamping operation is performed in accordance with a held value immediately before.

5 Claims, 12 Drawing Sheets

IMAGE SIGNAL PROCESSING APPARATUS, IMAGE SIGNAL PROCESSING METHOD AND CAMERA USING THE IMAGE SIGNAL PROCESSING APPARATUS

BACKGROUND OF THE INVENTION

1. Field of the Invention

The present invention relates to an image signal processing technique for an image signal such as an optical black level output from a solid state image sensor such as a CMOS sensor or CCD, particularly to the control technique of clamping means in image signal processing.

2. Related Background Art

In general, a solid state image sensor such as a CMOS sensor outputs an optical black (hereafter referred to as OB) from a light shielded pixel as the reference of a signal level. A circuit for processing the signal of a sensor clamps an OB level to a predetermined level and then, performs signal processing such as conversion of the level to a digital value. Normally, as shown in FIG. 12, several light-shielded pixels for respectively outputting an OB level to be clamped are set to several horizontal pixel lines at the upside of a solids state image sensor 11 and several horizontal lines and head portions or final portions of horizontal lines after the horizontal pixel lines. They are referred to as vertical OB ((Optical Black) pixels 51 and horizontal OB pixels 52.

Then, actual signal processing is described below by referring to FIG. 11. In FIG. 11, reference numeral 11 denotes a solid state image sensor. Reference numeral 12 denotes an analog signal processing block which first receives an image signal from the solid state image sensor 11 and which is mainly constituted of a programmable gain control circuit (PGA circuit) for adjusting a CDS circuit for correlated-double-sampling an image signal and the amplitude level of a signal. An output of the analog signal processing block 12 is input to an adding and subtracting circuit 13 for adjusting a DC level and then, input to an A/D converter 14 for converting the output into a digital value. A signal converted into a digital value is output to the outside and input to a feedback loop to adjust an OB level. The feedback loop first compares the OB level converted by the A/D converter 14 with a preset OB target level by an OB level determination block 15. Then, a D/A converter 16 for adjusting a DC level is set in accordance with the comparison result. Then, by inputting an output of the D/A converter 16 to the adding and subtracting circuit 13 and adding or subtracting the output to or from an output of the analog signal processing block 12, the OB level is clamped to an OB target level.

Moreover, a method for determining an abnormal OB pixel due to a defect from the output value and not using the OB pixel for clamping is also contrived. A specific example is shown below. When assuming the resolution of an A/D converter for converting an output of a solid state image sensor into a digital value as 12 bits, the output full scale of the A/D converter is 4095 LBS obtained by subtracting 1 from $2^{12}$ in accordance with 0 LBS. In this case, approx. 100 to 300 LBS are selected as clamp levels. After sufficiently inputting through clam in a vertical OB pixel period, the pixel of an output shifted from a clamp target value by for example, 10 LBS or more is determined as a defective pixel but it is not used for clamp. Thus, it is possible to prevent a malfunction of clamp due to the defective pixel and keep the quality of an output pixel.

Moreover, Japanese Patent Application Laid-Open No. 2004-80168 ([0011], [0013] and [0014], FIGS. 2 to 4) discloses the following technique as a solution when a black level difference occurs between an effective pixel area and an optical black area for black sinkage. That is, the signal of an OB area is set to zero by referring to an offset value to be added decided from the gain of a gain circuit, accumulated time of a device, time for reading one frame and ambient environmental temperature, from an offset table and adding the value to the clam value in the optical black area. Moreover, pedestal adjusting means is disclosed which integrates and averages outputs of the digital-converted optical black area and adjusts a reference level in an effective pixel area in accordance with the level of the result.

However, in the case of an OB pixel output shift smaller than 10 LSB, even the defect pixel determination method cannot determine the shift as a defective pixel. Light vertically entering a solid state image sensor does not enter an OB pixel by light shielding means. However, light having a long longitudinal coverage in a solid state image sensor such as infrared light is reflected from the back of the solid state image sensor before the light entering a pixel not light-shielded disappears due to photoelectric conversion. Therefore, the possibility for achieving the OB pixel becomes high. Therefore, as shown in FIG. 13, in the case of an OB output when photographing an object containing much infrared light, an output of an OB pixel closest to the object becomes peak and smoothly lowers up to the normal OB level as separating from the object. This is referred to as OB floating. Because a change of OB pixel outputs is smooth, the defect pixel determination method cannot determine the change.

Therefore, when normally clamping an output of a solid state image sensor photographing an object containing much infrared light, an OB level becomes constant as shown in FIG. 14 but image outputs before and after the object containing much infrared light sink in the black direction and images are deteriorated. This is referred to as black sinkage.

To determine an abnormal output of a smoothly changed image, a method for lowering the level for defect determination is considered in a method for determining an abnormal OB pixel due to a defect from its output value and not using the pixel for clamp. However, this method causes a trouble of determining a normal pixel as a defective pixel due to noise when setting a determination level to 2 LSB.

In the case of Japanese Patent Application Laid-Open No. 2004-80168 which is a Japanese patent, an offset addition circuit adds an offset from an offset correction table from various conditions. However, many storage memories are required. The pedestal adjusting means adds an offset by directly using a difference output using the integral average of OB areas. Moreover, because correction is made by using a correction table, storage memories are necessary.

Moreover, FIG. 15 is a block diagram showing a circuit configuration of a general image signal processing apparatus for an image signal output from a solid state image sensor such as a CCD or CMOS sensor. As shown in FIG. 15, the image signal processing apparatus is constituted of a correlated double sampling (CDS) circuit 151, programmable gain amplifier (PGA) 152, AD converter (ADC) 153, comparison circuit 154, clamp level register 155 and clamp circuit 156.

An image signal of a not-illustrated solid state image sensor such as a CCD or CMOS sensor is input to an image signal processing apparatus through an inter terminal IN. Sample hold and amplification are applied to the input image signal by the CDS circuit 151 and programmable gain amplifier 152 and then the image signal is converted from an analog signal into a digital signal by the AD converter 153 and output from an output terminal OUT.

Moreover, in the case of the image signal processing apparatus shown in FIG. 15, the clam circuit 156 controls an offset value to be added to an input image signal so that a black level becomes a predetermined level by using a signal from a light shielded pixel (OB) in a solid state image sensor. Specifically, first, a signal from a light shielded pixel output from the AD converter 153 is compared with a clamp level held by the clamp level register 155 as data by the comparison circuit 154. Then, the clamp circuit 156 performs control according to the comparison result (difference level) by the comparison circuit 154 and adjusts an offset level to be added to the CDS circuit 151 serving as an input portion and supplies the adjusted offset level to the CDS circuit 151. The light shielded pixel (OB) is a pixel which light incoming from an object does not enter though a photoelectric conversion element such as a photodiode is formed in a solid state image sensor.

The above-described conventional image signal processing apparatus has the following problem.

For example, as shown in FIG. 16A, a case is assumed in which a defect 161 is present in light-shielded pixel portions HOB and VOB of a solid state image sensor and a signal at an abnormal level is output as a signal from a light shielded pixel. In this case, the clamp circuit 156 operates so as to clamp the abnormal-level signal and so that an error at a clamp level does not occur. That is, in the case of a solid state image sensor, it is requested that there is no defect even for a light shielded pixel and this becomes a factor for lowering the yield of solid state image sensor.

Moreover, as shown in FIG. 16B for example, a case is assumed in which when photographing a high-luminance object, excessive light quantity enters a solid stage image sensor and light also enters-light-shielded pixel portions HOB and VOB of the device and thereby, a signal from a light shielded pixel fluctuates. In this case, because the clamp circuit 156 operates so as to performing clamping by using the signal level of the circuit 156, an error at a clamp level occurs. As shown in FIG. 16B, a signal level from a light shielded pixel 163 rises in a high-luminance area 162 and the clamp circuit 156 operates so as to lower the signal level. As a result, because the level of the row concerned (high luminance area 162) is totally lowered, the level is zonally lowered as illustrated.

However, there is the following method as a method for avoiding erroneous clamping. That is, the following clamp levels are used: a first clamp level using a signal from a light shielded pixel in a solid state image sensor and a second clamp level using a signal level in a horizontal blanking period in which a signal is not read from a photoelectric conversion element (pixel). Then, when the first clamp level becomes an abnormal level, it is switched to the second clamp level (for example, refer to Japanese Patent Application Laid-Open No. H9-247552 which is a Japanese patent).

For the above-described problem, it is one of effective techniques to decrease errors at a clamp level by sufficiently decreasing the gain value of the clamp circuit 156. However, when setting the gain of the clamp circuit 156 to a small value, the following problem occurs. That is, when shading in which an offset value changes in the vertical direction of a solid state image sensor is large, correction becomes insufficient. Therefore, because a gain is actually set in accordance with the relation of the trade-off, sufficiently decreasing the gain value of the clamp circuit 156 is not sufficient to solve the above described problem.

As an already-known method for solving these problems, there is a method for storing the address of a defective pixel among light shielded pixels in storing means (generally, non-volatile memory is used) and excluding a signal from a defective light-shielded pixel when deciding a clamp level. However, this method has a problem that a circuit scale is increased because storing means is necessary, it is necessary to perform test and adjustment every solid state image sensor and an integrated circuit of a special process like a nonvolatile memory is necessary.

Moreover, as another already-known method, there is a method for averaging signals from a plurality of light shielded pixel portions and performing clamping by using a signal level obtained as the average of the signals. In the case of this method, it is possible to decrease influences of a signal level shift due to a defect of a light shielded pixel or light entrance to a certain extent and perform clamping under a condition in which the number of random noises is small. However, when the shift of a level of a signal from a light shielded pixel is large, there is a problem that it is impossible to sufficiently reduce errors at a clamp level though it is possible to reduce influences to a certain extent by averaging.

SUMMARY OF THE INVENTION

It is an object of the present invention to easily avoid that an image signal black-sinks by clamping float of an OB image output due to incoming of infrared light.

It is another object of the present invention to restrain the error of a clamp level even if a level shift occurs in a signal from a light shielded pixel without extremely increasing a circuit scale.

The present invention is an image signal processing apparatus for applying predetermined processing to an image signal from a solid state image sensor having a plurality of effective pixels and a plurality of light shielded pixels, comprising:

an optical black level determining portion for comparing optical black outputs from the light shielded pixels with a set clamp level and outputting the differences as difference outputs;

a holding portion for holding the difference outputs;

an adding and subtracting circuit for clamping image signals in accordance with the difference outputs;

a comparator for comparing the difference outputs of the pixels with a set comparison level; and a counter portion for counting the number of times when the difference outputs are larger than the comparison level; wherein when the number of times exceeds the predetermined number of comparison times, the already held difference outputs are output from the holding portion to the adding and subtracting circuit.

Moreover, the present invention is an image processing method for applying predetermined processing to an image signal from a solid state image sensor having a plurality of effective pixels and a plurality of light shielded pixels, comprising:

a step of comparing the optical black outputs from the light shielded pixels with a set clamp level;

a step of outputting the differences between the optical black outputs and the set clamp level as difference outputs;

a step of clamping image signals in accordance with the difference outputs;

a step of holding the difference outputs;

a step of comparing the difference outputs of the pixels with a set comparison level every horizontal lines of the pixels; and a step of clamping the image signals by the already-held difference outputs on the horizontal lines when the number of times when the difference outputs are larger than the comparison level exceeds the predetermined number of comparison times.

Moreover, the present invention is an image signal processing apparatus for applying predetermined processing to an image signal from a solid state image sensor having a plurality of effective pixels and a plurality of light shielded pixels, comprising:

averaging means for calculating and outputting an average value of signals from the light shielded pixels and holding the calculated average value;

comparing means for comparing the average value held by the averaging means, a value to which a set threshold value is added and levels of the signal from the light shielded pixels; and clamping means for adjusting signals from the light shielded pixels to a predetermined level in accordance with the average value calculated by the averaging means; wherein the signals from the light shielded pixels or the average value held by the averaging means are or is selectively supplied to the averaging means in accordance with a comparison result by comparing means.

Furthermore, the present invention is an image signal processing apparatus for applying predetermined processing to an image signal from a solid state image sensor having a plurality of effective pixels and a plurality of light shielded pixels, comprising:

intermediate value outputting means for extracting a median value of signals from the light shielded pixels and outputting it and clamping means for adjusting signals from the light shielded pixels to a predetermined level in accordance with value the output from the intermediate value outputting means; wherein the intermediate-value outputting means is provided with first intermediate-value outputting means for dividing signals from n×m (n and m are optional natural numbers) light shielded pixels into sets of every n signals and extracting and outputting the median values of the set and second intermediate-value outputting means for forming m output values output from the first intermediate-value outputting means into one set and extracting and outputting the median values of the output values and the clamping means adjusts signals from the light shielded pixels to a predetermined level in accordance with an output value output from the second intermediate value outputting means.

Furthermore, the present invention is an image signal processing apparatus for applying predetermined processing to an image signal from a solid state image sensor having a plurality of effective pixels and a plurality of light shielded pixels, comprising:

computing means for calculating and outputting the average value of signals excluding the maximum value and minimum value among signals from the light shielded pixels; and clamping means for adjusting signals from the light shielded pixels to a predetermined level in accordance with the average value calculated by the computing means.

Furthermore, the present invention is an image signal processing apparatus having clamping means for performing clamping for adjusting signals from light shielded pixels of a solid state image sensor having effective pixels and light shielded pixels to a predetermined level, comprising:

averaging means for calculating and outputting the average value of signals from the light shielded pixels and holding the average value of the signals from the light shielded pixels used for the clamping; and comparing means for comparing the average value held by the averaging means and levels of signals from the light shielded pixels; wherein when the difference between the average value held by the averaging means and the level of signals from the light shielded pixels is larger than a predetermined threshold value, the average value of signals from the light shielded pixels held by the averaging means and the last-time clamping is supplied to the averaging means instead of signals from the light shielded pixels.

Furthermore, the present invention is an image signal processing method for applying predetermined processing to an image signal from a solid state image sensor having effective pixels and light shielded pixels, comprising:

an averaging step of calculating and outputting the average value of signals from the light shielded pixels and holding the calculated average value;

a comparing step of comparing the average value held in the averaging step with the level of signals from the light shielded pixels; and a clamping step of adjusting the signals from the light shielded pixels to a predetermined level in accordance with the average value calculated in the averaging step; wherein the average value held in the averaging step is supplied instead of signals from the light shielded pixels used for the averaging step in accordance with the comparison result in the comparing step.

According to the present invention, it is possible to determine optical black float which is a smooth change of optical black pixel output according to infrared light ever horizontal line. Moreover, when detecting the optical black float, it is possible to prevent black sinkage which is a sinkage of an image in the black direction by a clamp operation by clamping an optical-black clamp operation by an already-held difference output and obtain a high-quality image signal.

According to the present invention, it is possible to remove a signal in which a level shift occurs or replace the signal with other signal even if a level shift occurs in some of signals from a plurality of light shielded pixels by a defect in a light shielded pixel in a solid state image sensor or incoming light by adding a few circuits. Therefore, the present invention makes it possible to properly adjust an offset value to be added to a signal from a solid state image sensor. Therefore, the present invention makes it possible to restrain that a clamp level error occurs without extremely increasing a circuit scale even if a level shift occurs in a signal from a light shielded pixel and apply preferable signal processing. Moreover, it is possible to allow a defect of a certain degree in the light shielded pixel portion of a solid state image sensor, moderate a selection reference and improve a yield.

DESCRIPTION OF THE PREFERRED EMBODIMENTS

First Embodiment

Figure 1:
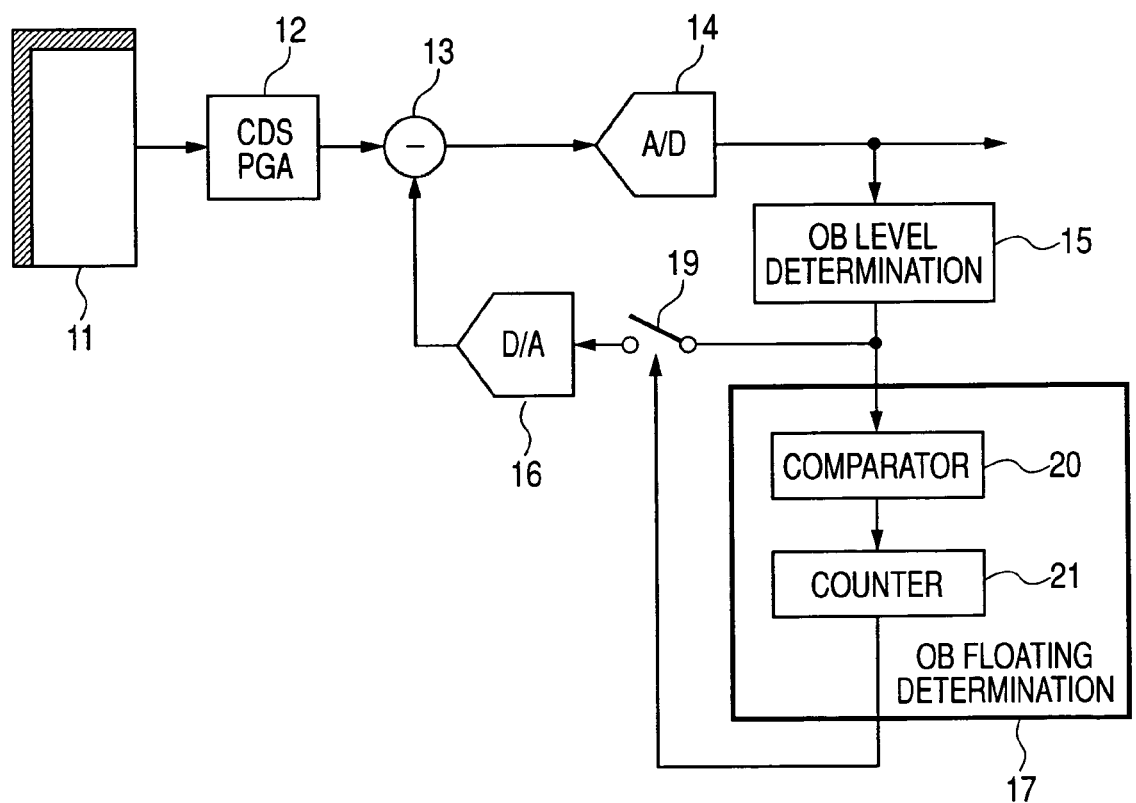
FIG. 1 is a block diagram of first embodiment.

First embodiment of the present invention is described below in detail by referring to FIG. 1. In FIG. 1, reference numeral 11 denotes a CMOS sensor serving as a solid state image sensor such as a CCD. Reference numeral 12 denotes an analog signal processing block for first receiving an image signal from the solid state image sensor 11, which is mainly constituted of a CDS circuit for double-sampling a signal from the solid state image sensor 11 and a programmable gain control circuit (PGA circuit) for adjusting the amplitude level of a signal. An output of the analog signal processing block 12 is input to the adding and subtracting circuit 13 for adjusting an OB (optical black; hereafter referred to as OB) level and then, input to the A/D converter 14 for converting the output into a digital value.

The signal converted into a digital value is output to the outside and also input to a feedback loop. The feedback loop first compares an OB level converted by the A/D converter 14 and a target OB level set value which is a clamp level. Then, the comparison result is input to a D/A converter 16 serving as a holding portion for setting an adjustment value by passing through a turned-on switch 19 as a difference output. Then, the OB level is clamped to a set value which is a clamp level by inputting an output of the D/A converter 16 to the adding and subtracting circuit 13 and adding or subtracting the output to or from an output of the analog signal processing block 12.

Moreover, the digital value converted by the A/D converter 14 is also input to an OB float determination block 17. Operations of the OB float determination block 17 are shown in the flowchart in FIG. 2 to be described later. The OB float determination block 17 detects a smooth OB float by infrared light. When the block 17 detects the OB float, it cuts off an input to the D/A converter 16 for setting an adjustment value from an OB level determination block 15 by outputting a signal for turning off the switch 19 but it does not perform the clamp adjustment operation. A value held by the D/A converter 16 also serving as a holding portion is output to the adding and subtracting circuit 13. Thereby, it is possible to prevent the malfunction of a clamp due to smoothly-changed OB float and keep the quality of an image signal. OB float detection by the OB float determination block 17 is detected when a comparator 20 and a counter 21 are built in, a large number of times is integrated by comparing the OB float with a set comparison value and the OB float becomes larger than a set number of comparison times.

Figure 2:
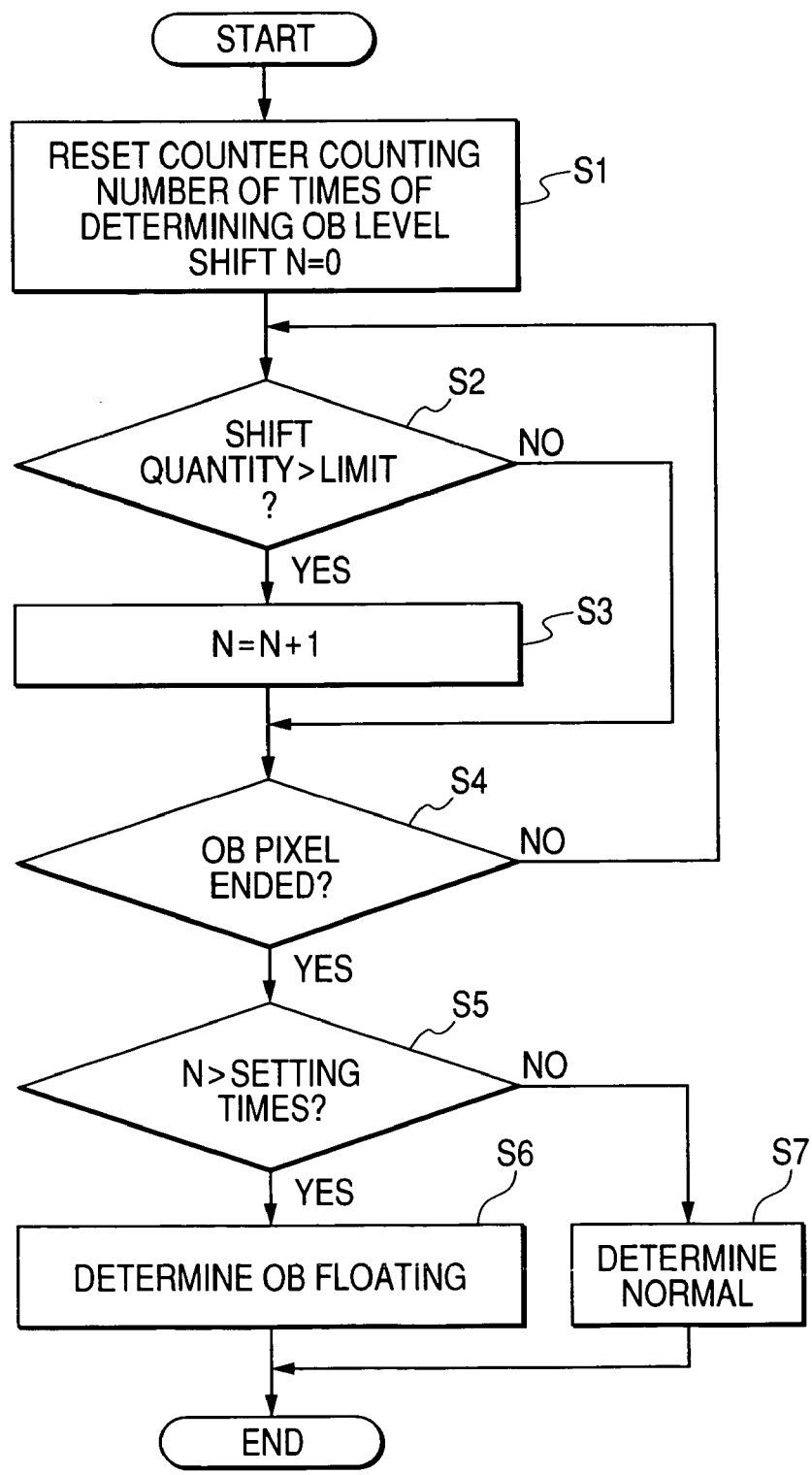
FIG. 2 is a flowchart for explaining operations of an embodiment of an OB float determination block.

Then, operations of the OB float determination block 17 are described below by referring to the flowchart in FIG. 2. First, a counter for integrating the number of determination times N of an OB level shift is reset to N=0 (S1). Then, a shift value from an OB level set value of the level of an input OB image output, that is, the above difference output is compared with an OB float determination limit value which is a comparison level (S2). In this case, the OB float determination limit value is set to a value between 1 LSB and 5 LSB when the intensity of random noise is from the intensity same as that of the random noise to five the intensity five times larger than the above intensity, for example, 1 LSBrms when using a 12 bit A/D converter. That is, a comparison level is set between the intensity same as that of the random noise of an optical black output signal and the intensity five times larger than the above intensity.

When a shift value is larger than the OB float determination limit value, 1 is added to the number of determination times N (S3) but when the shift value is smaller than the limit value, the number of determination times N is not changed. The loop when and after resetting the counter 21 is continued until set OB images are completed (S4). When the number of determination times N of a final OB level shift is larger than the predetermined number of comparison times (S5), OB float is determined (S6) but when the number of determination times N is smaller than the predetermined number of comparison times, normal OB is determined (S7).

The above determinations are performed by setting an OB pixel every horizontal line of a light shielded pixel of a solid state image sensor.

When infrared light does not come in, the shift of an OB level in the vertical direction is sufficiently smaller than 1 LSB per row even if no clamp is performed. Therefore, when infrared light does not come in, even if the counter 21 is added by random noise, the average value becomes a value ½ or smaller than the total number of set OB pixels of a horizontal line. However, when infrared light comes in and OB float occurs, the number of determination times N of an OB level shift of a counter value approaches the total number of set OB pixels. Therefore, by setting the number of comparison times of OB level determination to a value ranging between ⅔ of the total number of OB pixels and the total number of OB pixels (both included), used for clamp, it is possible to prevent malfunction when no infrared light comes in.

A clamp level, comparison level number of comparison times are predetermined to a manual at the time of shipping.

In the case of the above clamping method, it is also possible to take a conformation using a line for calculating the average value of difference outputs obtained by comparing with a predetermined clamp level every horizontal line and performing clamp when the difference outputs are equal to smaller than the comparison level.

In the case of the above clamping method, when the difference outputs when comparing with the predetermined clamp level are sufficiently larger than the predetermined comparison level and larger than a set third level, it is also possible to take a conformation in which the difference outputs are not added to the calculation for calculating the average value of the difference outputs.

Second Embodiment

Figure 3:
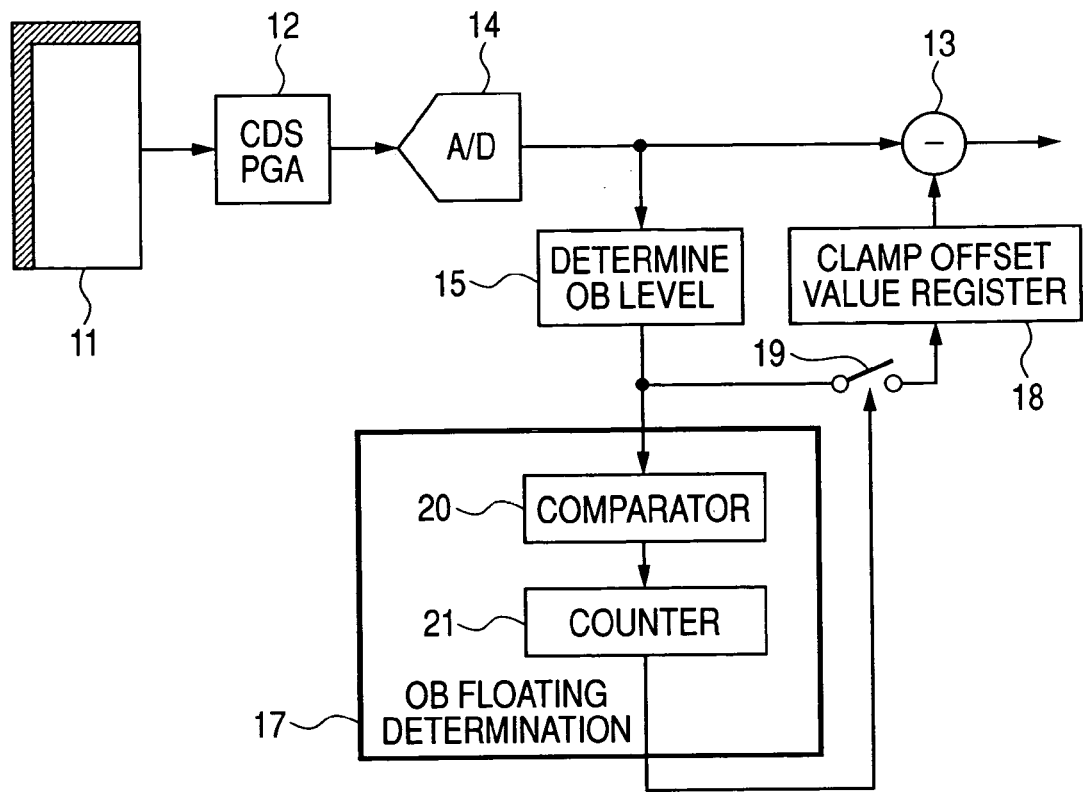
FIG. 3 is a block diagram of second embodiment.

Second embodiment of the present invention is described below by referring to FIG. 3. In the case of the first embodiment, an example is shown in which clamp determination at a digital value after A/D conversion is fed back to an analog signal before A/D conversion. However, the clamp determination can be also applied to digital clamp immediately after controlling an output digital value, which is shown in FIG. 3 for description. Description of an object same as that in the first embodiment is omitted.

In FIG. 3, reference numeral 11 denotes a solid state image sensor and 12 denotes an analog signal processing block for first receiving an image signal from the solid state image sensor. An output of the analog signal processing block 12 is input to the A/D converter 14 for converting the output into a digital value. The signal converted into the digital value is input to an adder and subtractor 13 for clamp and moreover input to the OB determination block 15 to compare an OB level converted by the A/D converter 14 and a target OB level set value which is a clamp level. Then, the value of a clamp offset value register 18 serving as a holding portion is changed in accordance with the difference output of the comparison result through the turned-on switch 19. By adding or subtracting the value of the clamp offset value register 18 to or from a digital value, an OB level is clamped to a set value.

Moreover, the digital value converted by the A/D converter 14 is also input to the OB float determination block 17. Operations of the OB float determination block 17 are the same as those of the embodiment 1 in FIG. 2. Therefore, this block detects smooth OB float due to infrared light. When the block detects the OB float, it outputs a signal for turning off the switch 19 to cut off the OB float and holds a value immediately before the clamp offset value register 18 serving as a holding portion independently of an output of the OB determination block 15. This value is output to the adder and subtractor 13. Thereby, it is possible to prevent the malfunction of clamp by smoothly-changed OB float and keep the quality of an image signal.

In the case of each of the image signal processing apparatuses respectively including clamping means according to the third to seventh embodiments of the present invention, a correlated double sampling (CDS) circuit or programmable gain amplifier (PGA) is not illustrated in FIGS. 4 to 8 showing their circuit configurations. However, FIGS. 4 to 8 assume that a correlated double sampling (CDS) circuit and programmable gain amplifier (PGA) are set to the front stage of an AD converter.

Third Embodiment

Figure 4:
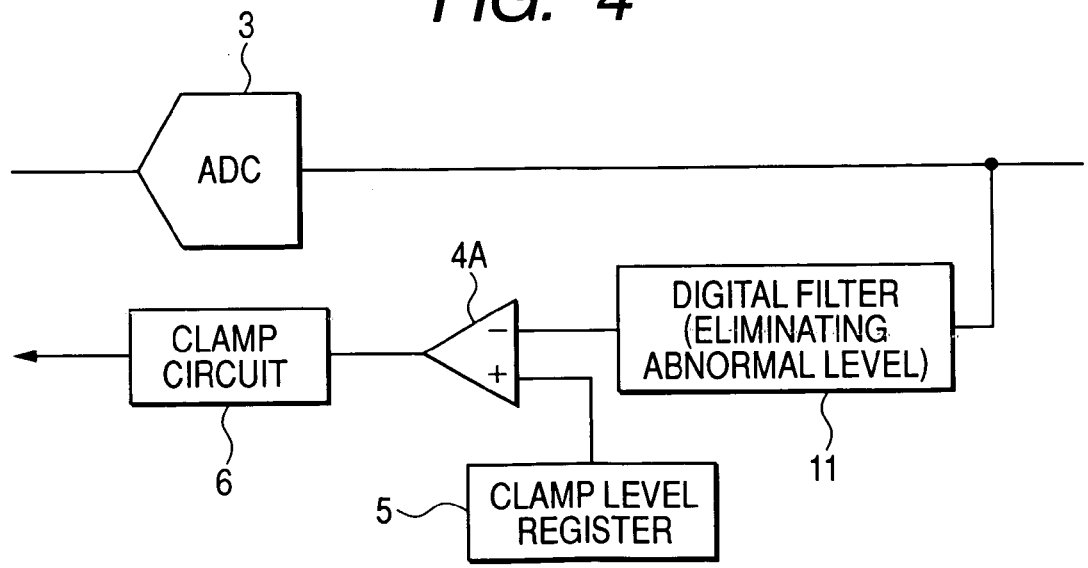
FIG. 4 is an illustration showing a configuration of an image signal processing apparatus of third embodiment of the present invention.
Figure 15:
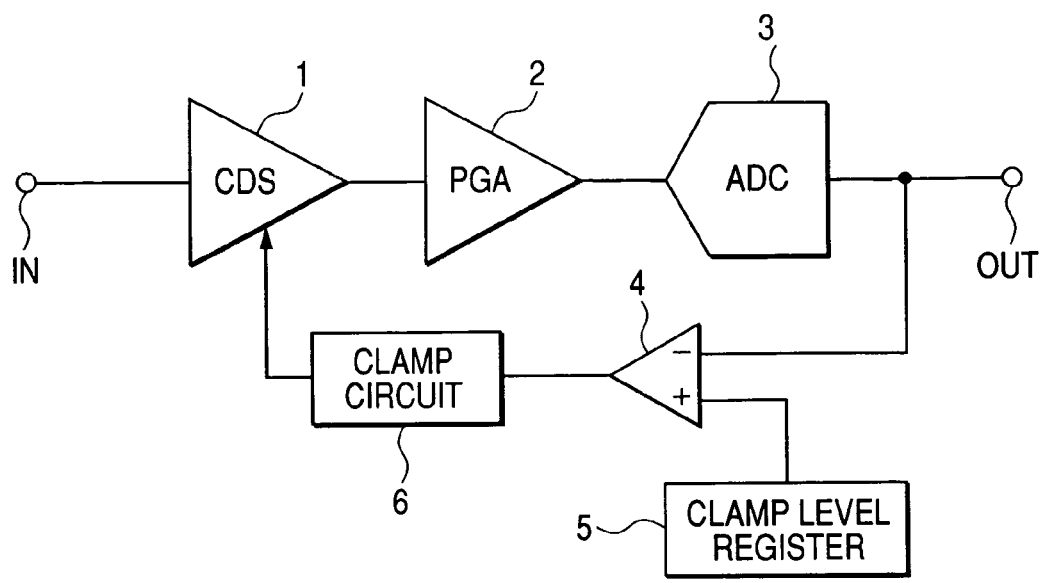
FIG. 15 is an illustration showing a configuration of a general image signal processing apparatus.
Figure 16A:
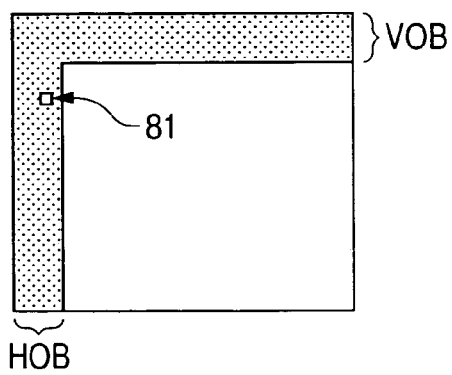
FIGS. 16A and 16B are illustrations for explaining problems of a conventional image signal processing apparatus.
Figure 16B:
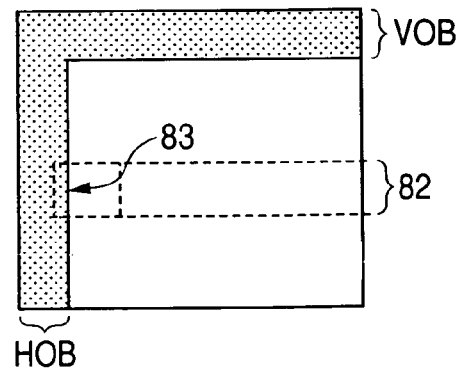

FIG. 4 is a block diagram showing a circuit configuration of an image signal processing apparatus of third embodiment of the present invention. In FIG. 4, the same symbol is provided for a block having a function same as that of the block shown in FIG. 15.

In FIG. 4, reference numeral 43 denotes an AD converter for converting an analog signal into a digital signal (digital data). An image signal from a solid state image sensor (e.g. CCD or CMOS sensor) having a plurality of effective pixels and a plurality of light shielded pixels is input to the AD converter 43 through not-illustrated CDS circuit and programmable gain amplifier and the AD converter 43 converts the image signal into a digital signal (digital data) and outputs the signal.

Reference numeral 411 denotes a digital filter detects and eliminates a signal whose level is shifted (abnormal level) among signals from light-shielded pixels output from the AD converter 43. That is, the digital filter 411 eliminates a signal when the level of the signal is out of a predetermined range but it makes the signal directly pass when the level is in the predetermined range.

Reference numeral 4A denotes a comparison circuit, more particularly a digital subtractor. A signal from a light shielded pixel filtered b the digital filter 411 and a clam set level held by the clamp level register 45 are input to the comparison circuit 4A and the circuit 4A outputs a signal corresponding to the difference level.

Reference numeral 46 denotes a clamp circuit which is controlled in accordance with a signal corresponding to the difference level supplied form the comparison circuit 4A to adjust an offset value (offset level) to be added to an input image signal to be added by an input portion (not-illustrated CDS circuit).

In the case of the image signal processing apparatus of the above-described third embodiment, a signal from a solid state image sensor is input to the AD comparator 43 through a not-illustrated CDS circuit and programmable gain amplifier, converted into a digital signal (digital data) and output to the outside of the image signal processing apparatus. Moreover, a digital signal output from the AD converter 43 is also supplied to the comparison circuit 4A through the digital filter 411. Furthermore, a signal from a light shielded pixel supplied to the comparison circuit 4A and a clamp setting level from the clamp level register 45 are compared by the comparison circuit 4A. Then, a signal corresponding to the difference level is output. The clamp circuit 46 is controlled in accordance with the signal corresponding to the difference level output from the comparison circuit 4A to adjust the offset value of the circuit 46.

In this case, an abnormal-level signal whose level is shifted due to an image defect or light leak among signals from light shielded pixels of a solid state image sensor is output from the AD converter 43 but it does not pass through the digital filter 411 (it is removed) and it is not output to the clamp circuit 46 as a result.

Thereby, according to the third embodiment, an abnormal-level signal whose level is shifted among signals from light shielded pixels of a solid state image sensor is detected and removed by the digital filter 411. Therefore, it is possible to properly adjust the offset value of a circuit in accordance with only signals from light shielded pixels excluding abnormal-level signals. Because it is allowed to only add the digital filter 411, it is possible to restrain a clamp error due to a pixel defect or light leak of the solid state image sensor without extremely increasing a circuit scale and apply preferable image processing to signals from the solid state image sensor. Moreover, it is possible to tolerate defects of the light shielded pixel portion of the solid state image sensor to a certain extent and moderate a selection reference (selection specification) and improve a yield.

Fourth Embodiment

Then, fourth embodiment is described below.

Figure 5:
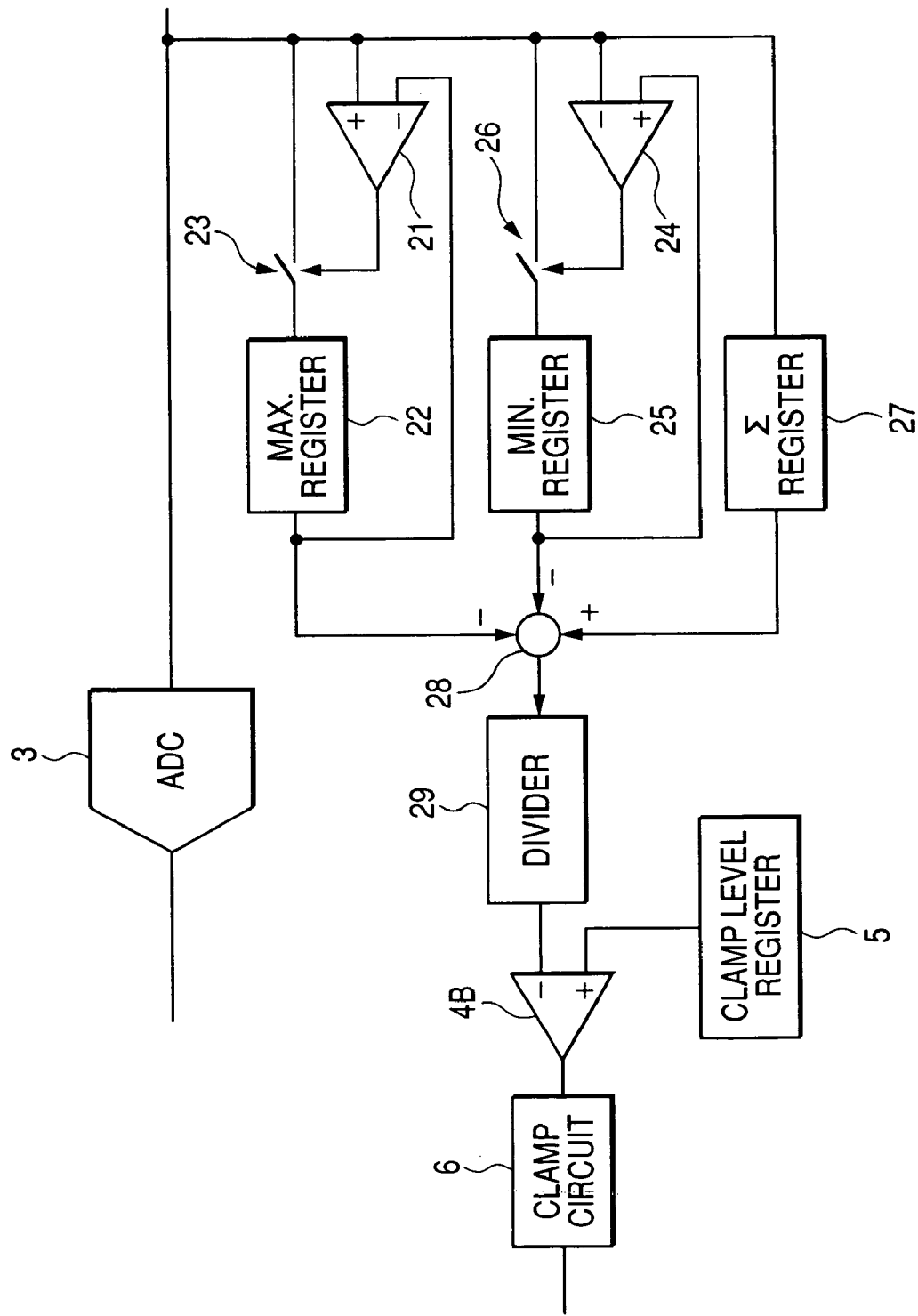
FIG. 5 is an illustration showing a configuration of an image signal processing apparatus of fourth embodiment.

FIG. 5 is a block diagram showing a circuit configuration of an image signal processing apparatus of the fourth embodiment. In FIG. 5, description duplicating with that in FIG. 4 is omitted.

In FIG. 5, reference numeral 521 denotes a comparison circuit (digital subtractor) to which a signal from a light shielded pixel output from an AD converter 53 and a signal level held by a maximum-value register 522 are input to control a switch 523 in accordance with the comparison result. Specifically, when the level of a signal from a light shielded pixel output from AD converter 53 is higher than the level of a signal held by the maximum-value register 522, the comparison circuit 521 closes the switch 523. However, when the level of the signal from the light shielded pixel is not higher than the level of the signal held by the maximum-value register 522, the comparison circuit 521 performs control so as to open the switch 523. Moreover, the switch 523 selectively supplies a signal from the light shielded pixel output from the AD converter 53 to the maximum-value register 522.

As a result of comparison by the comparison circuit 521, when the level of the signal from the light shielded pixel output from the AD converter 53 is higher than the level of the signal held by the maximum-value register 522, the following operation is performed. That is, the signal from the light shielded pixel output from the AD converter 53 is supplied to and held by the maximum-value register 522 as an updated value. Thus, a circuit constituted of the comparison circuit 521, maximum-value register 522 and switch 523 detects the maximum value of signals from light shielded pixels output from the AD converter 53.

Reference numeral 524 denotes a comparison circuit to which a signal from a light shielded pixel output from the AD converter 53 and the level of a signal held by a minimum-value register 525 are input to compare them. As a result of the comparison, when the level of the signal from the light shielded pixel output from the AD converter 53 is lower than the level of a signal held by the minimum-value register 525, the comparison circuit 524 closes a switch 526. However, when the level of the signal from the light shielded pixel is not lower than the level of the signal held by the minimum-value register 525, the comparison circuit 524 performs control so as to open the switch 526. Moreover, the switch 526 selectively supplies the signal from the light shielded pixel output from the AD converter 53 to the minimum-value register 525.

As a result of comparison by the comparison circuit 524, when the level of the signal from the light shielded pixel output from the AD converter 53 is lower than the level of the signal held by the minimum-value register 525, the following operation is performed. That is, the signal from the light shielded pixel output from the AD converter 53 is supplied to and held by the minimum-value register 525 as an updated value. Thus, a circuit constituted of the comparison circuit 524, minimum-value register 525 and switch 526 detects the minimum value of signals from light shielded pixels output from the AD converter 53.

Reference numeral 527 denotes a sum total (Σ) register to which a signal from a light shielded pixel output from the AD converter 53 is input to successively add input signals from light shielded pixels and calculate and hold the sum total.

Reference numeral 528 denotes a subtractor to which register values of the maximum-value register 522, minimum-value register 525 and sum total register 527 are supplied to perform predetermined operation and output the operation result. Specifically, the subtractor 528 calculates and outputs the value of [(sum total)−(maximum value)−(minimum value)].

Reference numeral 529 denotes a divider which divides an output value of the subtractor 528 by (light shielded pixel−2).

Reference numeral 4B denotes a comparison circuit which corresponds to the comparison circuit 4A shown in FIG. 4. A signal output from the subtractor 529 and a clamp setting level held by a clamp level register 55 are input to the comparison circuit 4B and the register 55 outputs a signal corresponding to the difference level.

In the case of the image signal processing apparatus of the fourth embodiment, a signal from a solid state image sensor is input to the AD converter 53 through not-illustrated CDS circuit and programmable gain amplifier, converted into a digital signal and output to the outside of the image signal processing apparatus. Moreover, a signal from a light shielded pixel among digital signals output from the AD converter 53 is added to the register value of the sum total register 527 as needed and updated. At the same time, a signal from a light shielded pixel among digital signals output from the AD converter 53 is compared with register values of the maximum-value register 522 and minimum-value register 525 and thereby, the maximum value and minimum value of signals from light shielded pixels are detected.

As a result of processing the data for a predetermined number of light shielded pixels, the operation of {(sum total)−(maximum value)−(minimum value)}/(number of pixels−2) is performed by the subtractor 528 and divider 529 while the sum total, maximum value and minimum value are stored in the registers 522, 525 and 527. Thereby, the average value of signals excluding the maximum value and minimum value among signals from light shielded pixels. The operation result is compared with a clamp setting level from the clamp level register 55 by the comparison circuit 4B and a signal corresponding to the difference level is output. The clamp circuit 56 is operated in accordance with the signal corresponding to the difference level output from the comparison circuit 4B to adjust the offset value of the circuit.

As described above, according to the fourth embodiment, a signal having the highest signal level and a signal having the lowest signal level are removed from signals from a plurality of light shielded pixels. Thereby, it is possible to properly adjust the offset value of the circuit in accordance with the average value of signals from light shielded pixels excluding these maximum value and minimum value and a clamp operation having a small clamp error can be made only by adding a small number of circuits. Therefore, it is possible to apply more preferable image processing to a signal from a solid state image sensor and moderate a selection reference (selection specification) of the slid state image sensor and improve a yield.

Fifth Embodiment

Then, fifth embodiment is described below.

Figure 6:
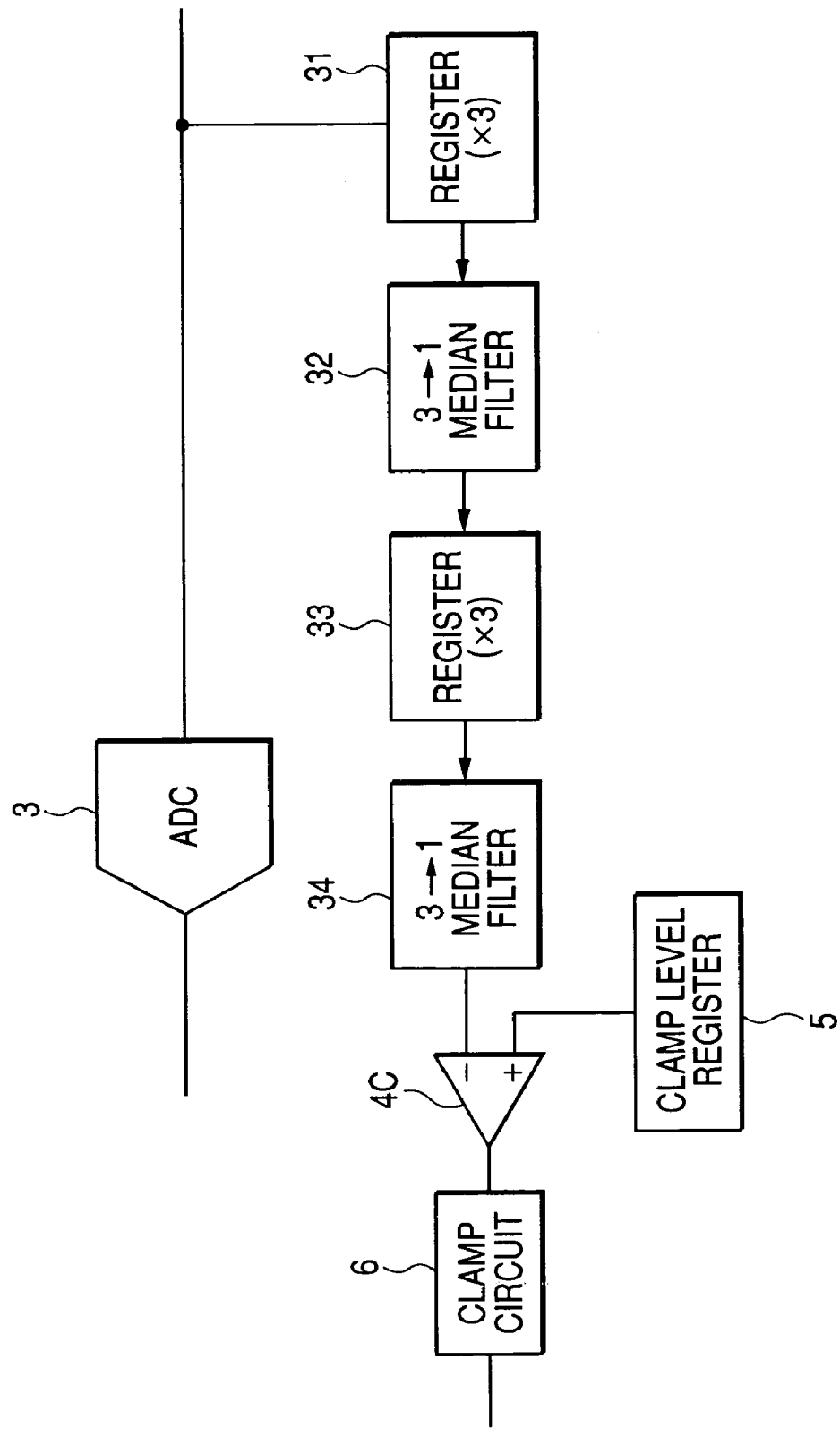
FIG. 6 is an illustration showing a configuration of an image signal processing apparatus of fifth embodiment.

FIG. 6 is a block diagram showing a circuit configuration of an image signal processing apparatus of the fifth embodiment of the present invention. In FIG. 6, a block having a function same as that of the block shown in FIG. 4 is provided with the same reference numeral and duplicated description is omitted.

In FIG. 6, reference numerals 631 and 633 are registers for respectively holding three input signals (data values). Reference numerals 632 and 634 are median filters for respectively extracting the median value (intermediate value) from three signals (data values) held by the registers 631 and 633.

A first median filter block for extracting the median value from signals from three light-shielded pixels output from the AD converter 63 is constituted of the register 631 and median filter 632. Moreover, a second median filter block for extracting the median value from three median values extracted by the first median filter block is constituted of the register 633 and median filter 634.

An almost intermediate value corresponding to the median value of signals from 9 light shielded pixels or almost the median value though it is not accurately an intermediate value is extracted by the registers 631 and 633 and the median filters 632 and 634 (first and second median filter blocks).

Reference numeral 4C denotes a comparison circuit which corresponds to the comparison circuit 4A shown in FIG. 4. A signal output from the median filter 634 and a clamp setting level held by the clamp level register 65 are input to the comparison circuit 4C and the circuit 4C outputs a signal corresponding to the difference level.

In the case of the image signal processing apparatus of the above-described fifth embodiment, a signal from a solid state image sensor is input to the AD converter 63 through not-illustrated CDS circuit and programmable gain amplifier, converted into a digital signal and output to the outside of the image signal processing apparatus.

Moreover, the following processing for signals for 9 pixels is applied to a signal from a light shielded pixel among digital signals output from the AD converter 63. First, an intermediate value is extracted as needed by considering signals for three continuous pixels as one group and three extracted intermediate values are stored in the register 633 by the first median filter block constituted of the register 633 and median filter 632. Moreover, intermediate value extraction is performed by using three values stored in the register 633 by the second median filter block constituted of the register 633 and median filter 634 and the extracted intermediate value is output to the comparison circuit 4C.

An output value of the median filter 634 (intermediate value of signals from 9 light shielded pixels) is compared with a clamp setting level from the clamp level register 65 by the comparison circuit 4C. As a result, the clamp circuit 66 is operated in accordance with a signal corresponding to a signal corresponding to a difference level output from the comparison circuit 4C to adjust the offset value of the circuit.

As described above, according to the fifth embodiment, signals from 9 light shielded pixels are first divided into three sets every three pixels and the median value is extracted by the median filter 632. Then, the median value is extracted by the median filter 634 by using the total of three median values extracted for each set. As a result, a pseudo intermediate value among signals from 9 light shielded pixels is extracted. Then, the offset value of a circuit is properly adjusted in accordance with the pseudo intermediate value.

In this case, a 9-to-1 median filter for extracting one median value from 9 factors has a large circuit scale. Therefore, this embodiment makes it possible to extract a pseudo intermediate value among signals of a plurality of light shielded pixels (9 pixels) without extremely increasing the circuit scale by cascading 3-to-1 median filters for respectively extracting one median value from three factors to form two-stage configuration. Because the clam operation is performed by using the extracted pseudo intermediate value, it is possible to restrain clamp errors from occurring, perform a clamp operation having a smaller error apply preferable image signal processing to a signal from a solid stage image sensor. Moreover, it is possible to further tolerate a defect of the light shielded pixel portion of the solid state image sensor, extremely moderate a selection reference (selection specification) and improve a yield.

The above description shows a case of performing processing by using signals from 9 light shielded pixels as an example. However, the number of signals (number of pixels) from light shielded pixels to be used is optional. By properly changing the registers 631 and 633 and median filters 632 and 634 in accordance with the number of signals, it is possible to perform processing by using signals from an optional number of light shielded pixels.

Sixth Embodiment

Then, sixth embodiment is described below.

Figure 7:
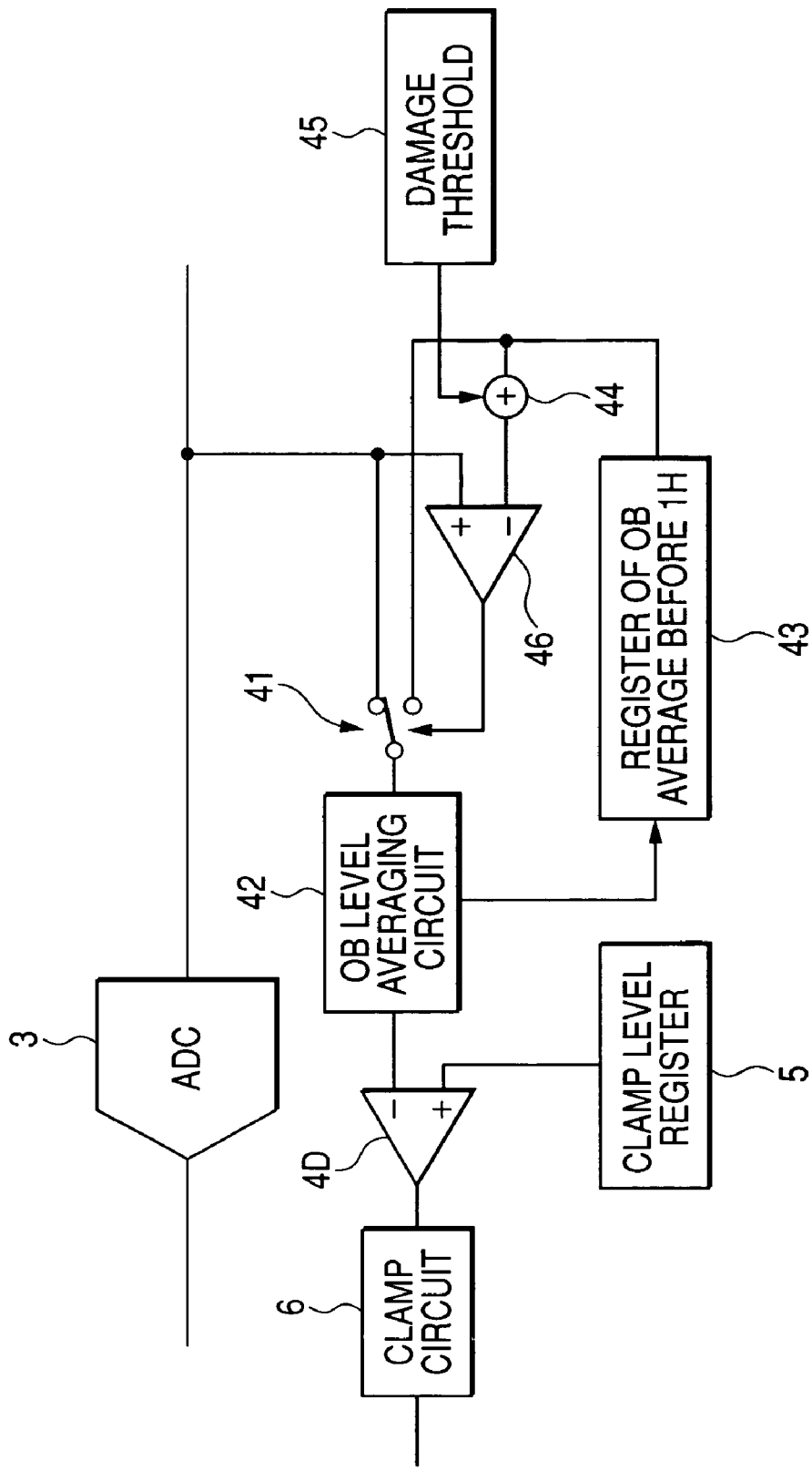
FIG. 7 is an illustration showing a configuration of an image signal processing apparatus of sixth embodiment.

FIG. 7 is a block diagram showing a circuit configuration of an image signal processing apparatus of sixth embodiment of the present invention. In FIG. 7, description duplicated with FIG. 4 is omitted.

In FIG. 7, reference numeral 741 denotes a switch for selectively supplying a signal from a light shielded pixel output from an AD converter 73 or a value output from a 1H-before OB average register 743 to an OB level averaging circuit 742.

The OB level averaging circuit 742 calculates and outputs the average value of signals (some or all of values output from 1H-before register 743 may be included). The 1H-before OB register 743 is a register for holding the average value calculated by the OB level averaging circuit 742 used for the last-time clamping.

Reference numeral 744 denotes an adder which outputs an operation result by adding the average value used for the last-time clamping held-by the 1H-before OB average register 743 and a defect threshold value held by a defect threshold value register 745.

Reference numeral 746 denotes a comparison circuit to which a signal from a light shielded pixel output from the AD converter 73 and an output value of the adder 744 are input to compare them. As a result of the comparison, when the signal from the light shielded pixel output from the AD converter 73 is equal to or smaller than the output value (average value one frame before+defect threshold value) of the adder 744, it performs the following operation. That is, the comparison circuit 746 controls the switch 741 so that the signal from the light shielded pixel output from the AD converter 73 is supplied to the OB level averaging circuit 742. However, when the signal from the light shielded pixel output from the AD converter 73 is larger than the output value of the adder 744, the comparison circuit 746 performs the following operation. That is, the comparison circuit 746 controls the switch 741 so that the output value from the 1H-before OB average register 743 is supplied to the OB level averaging circuit 742.

Reference numeral 4D denotes a comparison circuit which corresponds to the comparison circuit 4A shown in FIG. 4. An average value output from the OB level averaging circuit 742 and a clamp setting level held by the clamp level register 75 are input to the comparison circuit 4D and the comparison circuit 4D outputs a signal corresponding to the difference level.

In the case of the image signal processing apparatus of the above-described sixth embodiment, a signal from a solid state image sensor is input to the AD converter 73 through not-illustrated CDS circuit and programmable gain amplifier, converted into a digital signal and output to the outside of the image signal processing apparatus. Moreover, signals from a light shielded pixel among digital signals output from the AD converter 73 are averaged by the OB level averaging circuit 742. In this case, the average value used for the last-time (one frame before) processing is stored in the 1H-before OB average register 743. The comparison circuit 746 compares the "last-time average value+defect threshold value" and the level of a signal from a light shielded pixel output from the present AD converter 73 for each pixel.

As a result of the comparison by the comparison circuit 746, when the signal level from the present light shielded pixel is higher than the "last-time average value+defect threshold value", in other words, the difference between the last-time average value and the signal level from the present light shielded pixel is larger than the defect threshold value, the following operation is performed. That is, it is determined that a signal from the present light shielded pixel is abnormal due to the influence of a defect or light leak, the signal is not input to the OB level averaging circuit 742 but instead, the last-time average value is input to the OB level averaging circuit 742. The signal from the present light shielded pixel is replaced with the last-time average value for each pixel.

Moreover, the average value calculated by the OB level averaging circuit 742 is also supplied to the comparison circuit 4D and the average value is compared with the clamp level setting level from the clamp level register 75 by the comparison circuit 4D. The clamp circuit 76 is operated in accordance with a signal corresponding to a difference level output as the result to adjust the offset value of the circuit.

As described above, according to the sixth embodiment, it is possible to restrain clamp errors by properly adjusting the offset value of a circuit in accordance with an averaged signal level and reduce influences of random noises. Moreover, when the difference between the last-time average value and the signal level from the present light shielded pixel is large than a defect threshold value, it is determined that the signal from the light shielded pixel is abnormal and the last-time average value is used instead. Thereby, a signal from a light shielded pixel which is determined as an abnormal level is not used for a clamp operation but a clamp operation having a smaller error can be made and it is possible to apply preferable image signal processing to a signal from the solid state image sensor. Moreover, it is possible to tolerate defects of the light shielded pixel portion of the solid state image sensor to a certain extent, moderate a selection reference (selection specification) and improve a yield.

The image signal processing apparatus shown in FIG. 7 removes a defect corresponding to a while defect of a light shielded pixel of a solid state image sensor. However, to remove a defect corresponding to a black defect, it is allowed to use a subtractor instead of the adder 746.

Seventh Embodiment

Then, seventh embodiment is described below.

Figure 8:
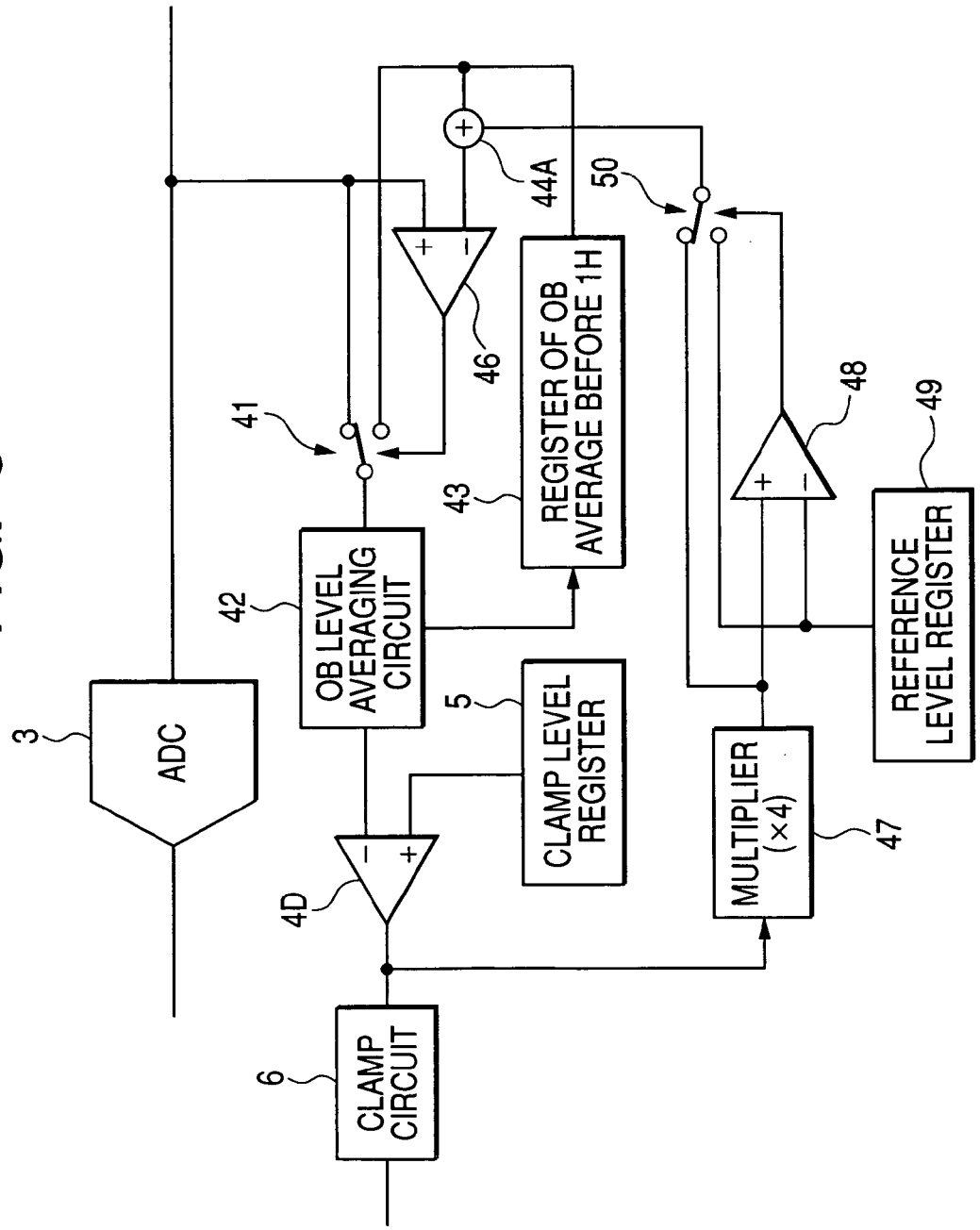
FIG. 8 is an illustration showing a configuration of an image signal processing apparatus of seventh embodiment.

FIG. 8 is a block diagram showing a circuit configuration of an image signal processing apparatus of the seventh embodiment. The image signal processing apparatus of the seventh embodiment described below is constituted by adding a circuit block forsetting a defect threshold value to the image signal processing apparatus of the above sixth embodiment. In FIG. 8, duplicated description with FIGS. 4 and 7 is omitted.

In FIG. 8, reference numeral 847 denotes a multiplier which increases a clamp error (signal corresponding to a difference level which is an output of the comparison circuit 4D) up to four times.

Reference numeral 848 denotes a comparison circuit to which an output signal of the multiplier 847 and the reference level of defect threshold values held by a reference-level register 849 are input to the comparison circuit 848 and the circuit 848 compares them. As a result of the comparison, when the level of an output signal of the multiplier 847 is equal to or higher than a reference level, the comparison circuit 848 controls a switch 850 so that the output signal of the multiplier 847 is supplied to an adder 844 (corresponding to the adder 744 shown in FIG. 7). However, when the level of the output signal of the multiplier 847 is lower than the reference level, the comparison circuit 848 controls the switch 850 so that the reference level held by the reference level register 849 is supplied to the adder 844.

The image signal processing apparatus of the above-described seventh embodiment operates similarly to the image signal processing apparatus of the sixth embodiment and an advantage same as that of the sixth embodiment is obtained. However, in the case of the image signal processing apparatus of the seventh embodiment, a clam operation reaches a target clamp level by repeating the clam operation a plurality of times after a power supply is turned on. Therefore, the difference between a target clamp level and the level of an actual signal output from a light shielded pixel is large in the first several times and a correction value for each clamping is also large. Therefore, the difference between the average value used for the last-time processing and the present level is always present as a difference by the correction value. Therefore, when a value larger than the correction value is not set as a defect threshold value, it is determined that all present levels are abnormal levels and the clamp operation cannot be normally performed.

Therefore, in the case of the example shown in FIG. 8, a value four times larger than the present clamp error is used as a defect threshold value by making the value proportional to the present clamp error. In the case of the above-described example, a gain value is four times. However, it is also allowed to set a gain value by considering each characteristic because the optimum value of a gain value depends on a system including the characteristic of a solid state image sensor.

The image signal processing apparatus shown in FIG. 8 is constituted so that the level of the (clamp error)×4(gains) is compared with reference level head by the reference level register 849 and larger one of them is supplied to the adder 844 as a defect threshold value. In this case, the reference level represents a necessary minimum level as a defect threshold value.

If comparison with a reference level is not performed and the level of (clamp error)×4 is always made into a defect threshold value, when the clamp error decreases to 0, the threshold value also decreases to 0 and it is determined that all the present levels are abnormal levels. Therefore, in the case of the image signal processing apparatus of the seventh embodiment, by setting a register 849 for holding a reference level and comparing the level of (clamp error)×4 with the reference level, it is possible to securely avoid that a defect threshold value becomes a reference value or less.

Eighth Embodiment Eighth embodiment of the present invention is described below by referring to FIGS. 9 and 10. The eighth embodiment when applying an image signal processing apparatus including clamping means of the present invention to a still camera 100 or solid state image sensor system is described below in detail. The solid state image sensor system is an image sensor system using a solid state image sensor which hereafter serves as an embodiment equal to the still camera 100.

Figure 9:
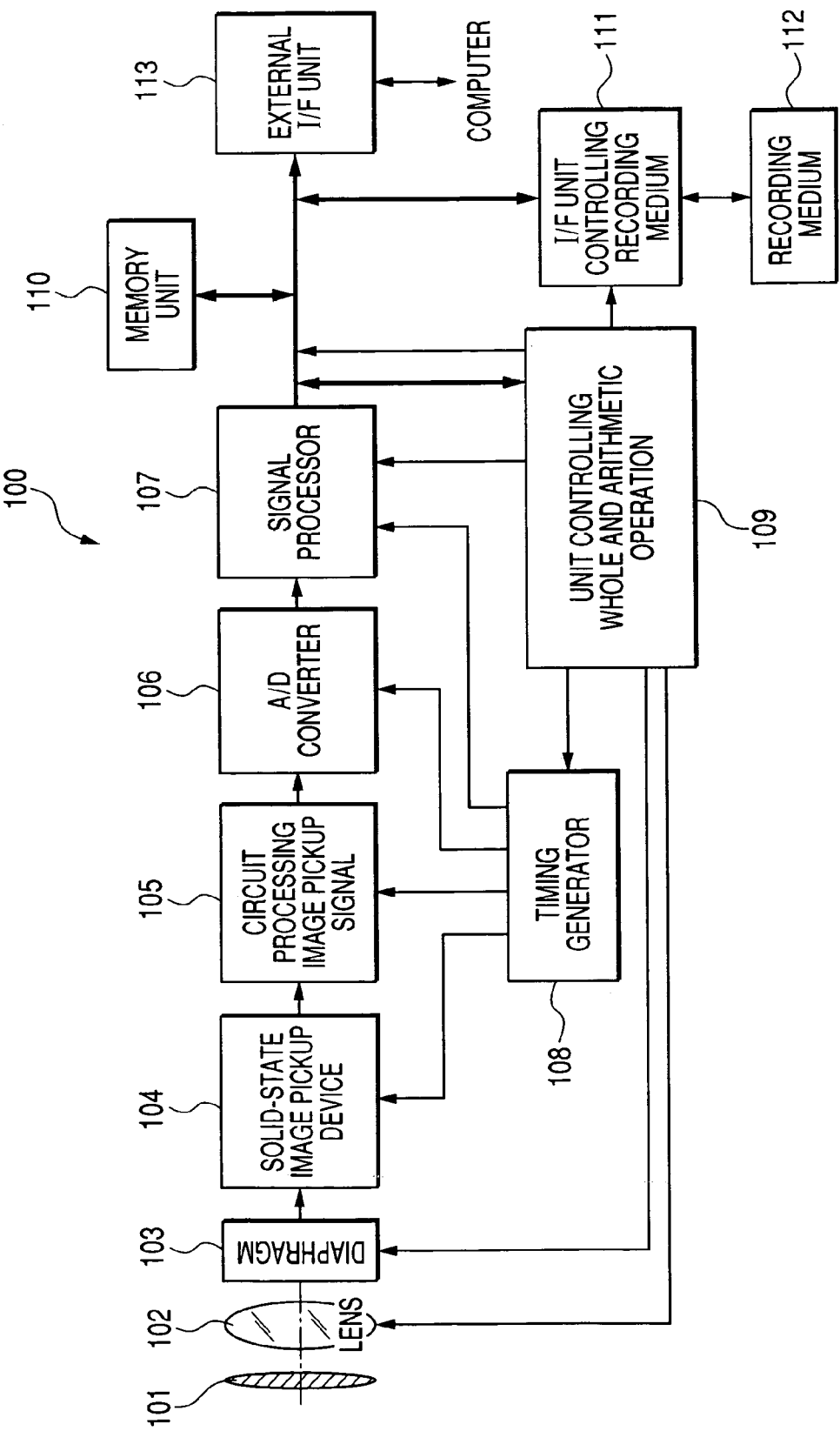
FIG. 9 is a block diagram of eighth embodiment.

FIG. 9 is a block diagram sowing a case of applying the image signal processing apparatus including a solid state image sensor and clamping means which is any one of the first to seventh embodiments to the still camera 100.

A case of applying the second embodiment to FIG. 9 is specifically described below.

In FIG. 9, reference numeral 101 denotes a barrier also serving as a lens protect and a main switch, 102 denotes a lens for imaging an optical image of an object on a solid state image sensor 104 and 103 denotes a diaphragm for changing the light quantity passing through the lens 102. Reference numeral 104 denotes a solid state image sensor for taking in an object imaged by the lens 102 as an image signal, 105 denotes an image signal processing circuit for processing an analog signal and 106 denotes an A/D converter for analog-digital-converting an image signal output from the solid state image sensor 104. Reference numeral 107 denotes a signal processing portion for applying various corrections to the image data output from the A/D converter 106 or compressing data, in which correction of the second embodiment to an OB float is directly performed. The signal processing portion 107 includes the adding and subtracting circuit 13, OB level determination block 15, OB float determination block 17 and clamp offset value register 18 of the second embodiment. Reference numeral 108 denotes a timing generating portion for outputting various timings to the solid state image sensor 104, image signal processing circuit 105, A/D converter 106 and signal processing portion 107 and 109 denotes a total control and operation portion for controlling various operations and the whole of the still camera 100. Reference numeral 110 denotes a memory portion for temporarily storing image data, 111 denotes a recording-medium control I/F portion for recording or reading data in or from a recording medium and 112 denotes a removable recording medium such as a semiconductor memory for recording or reading image data. Reference numeral 113 denotes an external I/F portion for communicating with an external computer.

The above embodiment uses a signal from a light shielded pixel output from the AD converter 106 in the processing for adjusting the offset value of a circuit. However, it is also allowed to use a signal from a solid state image sensor before input to the AD converter 106. In this case, it is allowed to properly constitute each circuit by an analog circuit.

Figure 10:
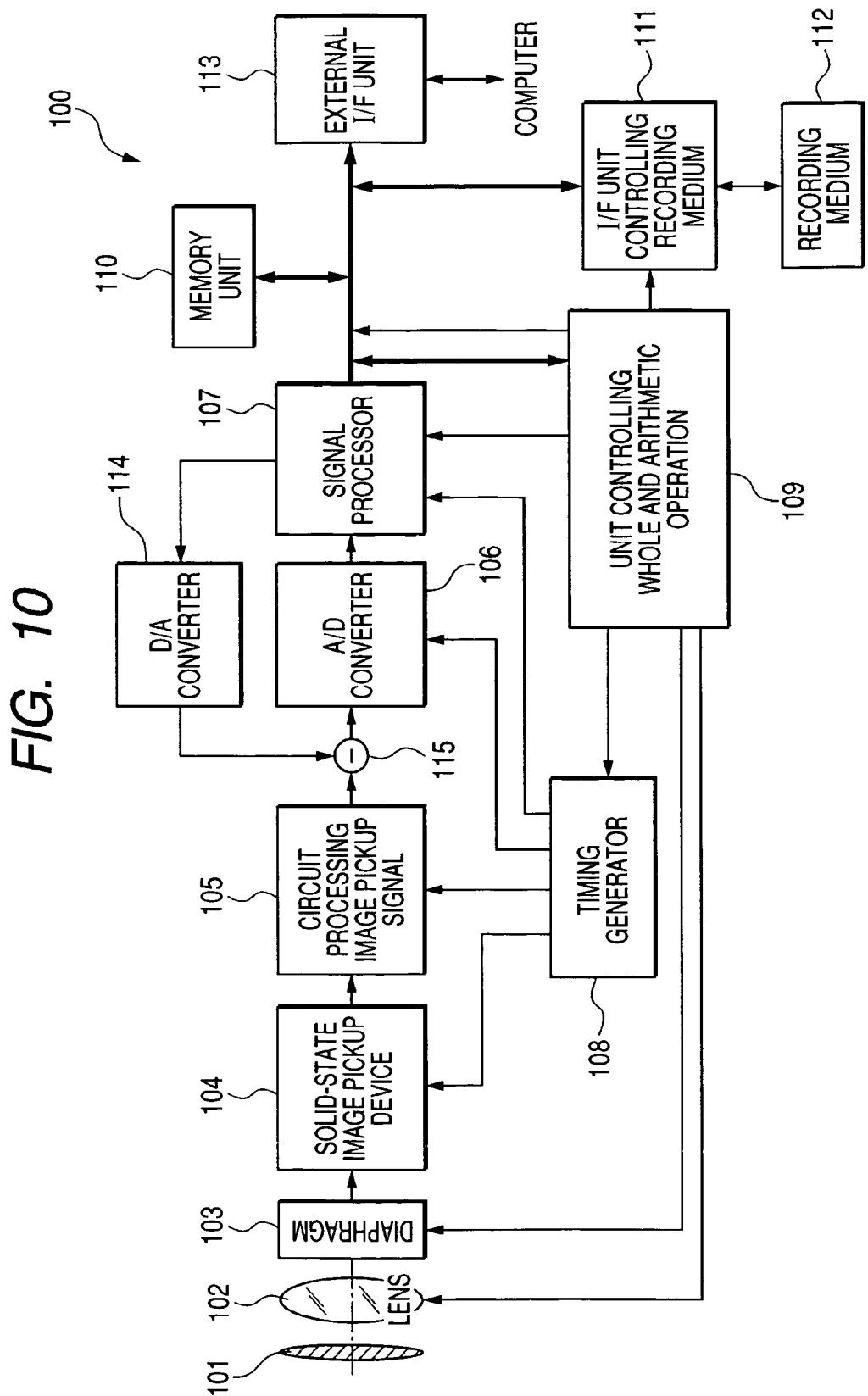
FIG. 10 is a block diagram of ninth embodiment.
Figure 11:
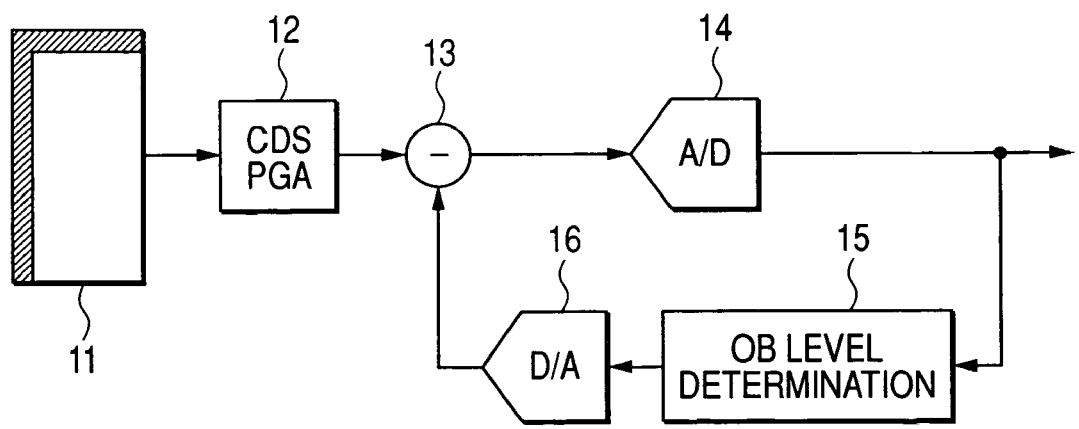
FIG. 11 is a block diagram of a conventional clamp circuit.
Figure 12:
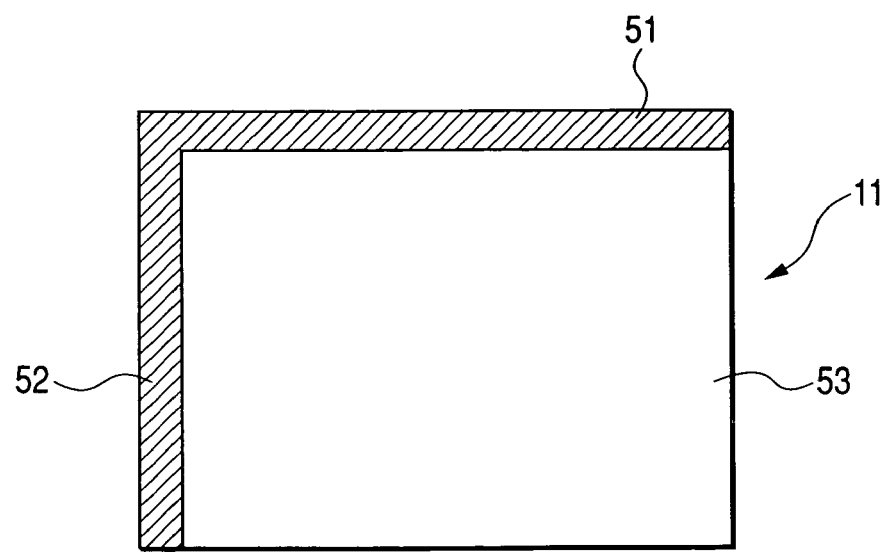
FIG. 12 is an image of a solid state image sensor.
Figure 13:
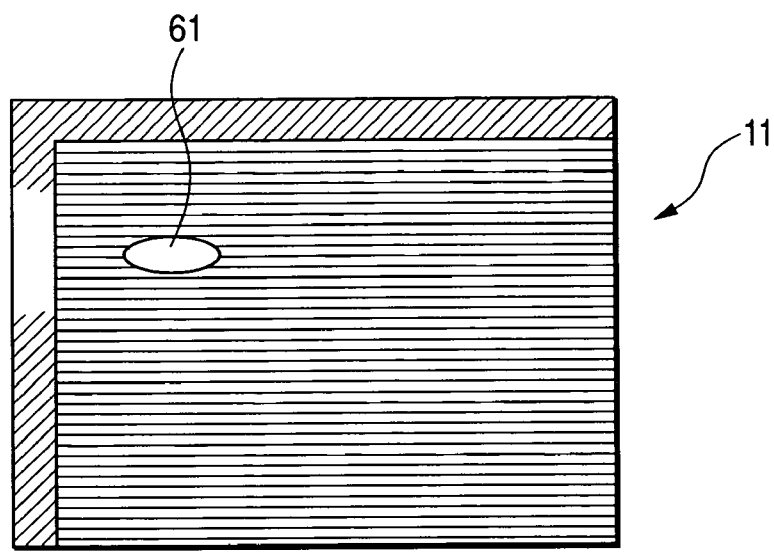
FIG. 13 is an image when image-picking up an object containing much infrared light.
Figure 14:
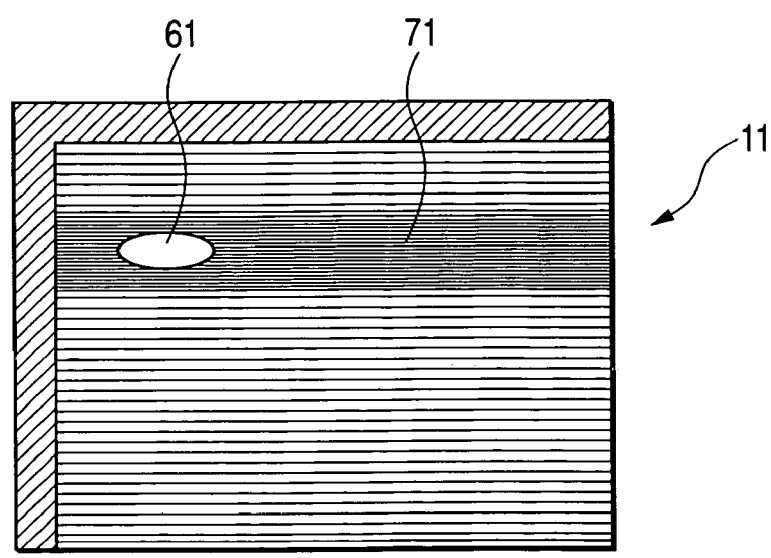
FIG. 14 is an image when clamping an object containing much infrared light.

A case of applying the first embodiment to FIG. 10 is specifically described below.

FIG. 10 is a block diagram showing a case of applying the image signal processing apparatus of the first embodiment including the solid state image sensor and the clamping means to the still video camera 100. The difference from FIG. 9 when executing the invention of the ninth embodiment is in that the D/A converter 114 and adding and subtracting circuit 115 are added. In this case, the signal processing portion 107 includes functions of the OB level determination block 15 and OB float determination block 17. Thereby, operations of the first embodiment to OB float are directly performed.

Then, operations of the still video camera 100 of the above configuration at the time of photographing are described below.

When the barrier 101 is opened, a not-illustrated main power supply is turned on, then the power supply of a not-illustrated control system is turned on and the power supply of an image sensor system circuit such as the A/D converter 106 is turned on.

Then, to control exposure light quantity, the total control and operation portion 109 opens the diaphragm 103, and a signal output from the solid state image sensor 104 is converted by the A/D converter 106 and input to the signal processing portion 107. In this case, processing of the embodiment 1 or embodiment 2 and other processing are performed. The operation of exposure is performed by the total control and operation portion 109 in accordance with the data. Luminosity is determined in accordance with a result of light measurement and the total control and operation portion 109 controls the diaphragm in accordance with the determination result.

Then, a high-frequency component is fetched together with a signal output from the solid state image sensor 104 and the operation of the distance up to an object is performed by the total control and operation portion 109. Thereafter, it is determined whether focusing is realized by driving the lens 102. When it is determined that focusing is not realized, distance measurement is performed by driving the lens 102 again. Then, main exposure is started after focusing is confirmed.

When the exposure is completed, an image signal output from the solid state image sensor 104 is A/D-converted by the A/D converter 106, the correction processing of the embodiment 1 or 2 and other processing are applied to the image signal by the signal processing portion 107 and written in the memory portion 110 by the total control and operation portion 109.

Thereafter, the data accumulated in the memory portion 110 passes through the recording-medium control I/F portion 111 in accordance with the control by the total control and operation portion 109 and is recorded in the removable recording medium 112 such as a semiconductor memory.

Moreover, it is allowed to perform image formation by passing through the external I/F portion 113 and directly inputting the data to a computer or the like.

Moreover, each of the above embodiments only shows an example of crystallization for executing the present invention but the technical range of the present invention must hot be definitely interpreted. That is, the present invention can be executed in various forms without deviating from its technical idea or main characteristic.

This application claims priority from Japanese Patent Application Nos. 2004-252386 filed Aug. 31, 2004 and 2004-342128 filed Nov. 26, 2004, which are hereby incorporated by reference herein.

What is claimed is:

1. An image signal processing apparatus for subjecting to processing an image signal from a solid state image sensor having a plurality of effective pixels and a plurality of light shielded pixels, comprising:

averaging means for calculating and outputting average values of signals from the light shielded pixels and holding the calculated average values;

adding means for providing an output signal level obtained by superimposing a set threshold value, for determining whether a signal from the light shielded pixel is at an abnormal level or not, on the average values held by the averaging means;

comparing means for comparing the level of the signal from the adding means with levels of the signal from the light shielded pixels; and clamping means for adjusting signals from the light shielded pixels to a predetermined level in accordance with the average value calculated by the averaging means, wherein signals from the light shielded pixels or the average values held by the averaging means are selectively supplied to the averaging means in accordance with a comparison result by the comparing means, and wherein, when the difference between the average value held by the averaging means and the level of signals from the light shielded pixels is larger than the set threshold value as determined by a comparison by the comparing means, the average value previously held by the averaging means is supplied to the averaging means instead of the signals from the light shielded pixels, and the signals from the light shielded pixels are provided to the average means instead of the average value previously held by the averaging means when the difference between the average value held by the averaging means and the level of signals from the light shielded pixels is smaller than the set threshold value as a result of comparison by the comparing means.

2. The image signal processing apparatus according to claim 1, wherein the averaging means includes average value calculating means for calculating and outputting the average value of signals from the light shielded pixels and average storing means for storing the average value calculated by the average value calculating means.

3. The image signal processing apparatus according to claim 1, wherein the clamping means adjusts signals from the light shielded pixels to a predetermined level in accordance with the difference between the average value calculated by the averaging means and a predetermined clamp setting level.

4. The image signal processing apparatus according to claim 1, wherein the apparatus is incorporated in a camera that includes:
- a lens for imaging an optical image on a solid state image sensor; and
- a diaphragm for changing the light quantity passing through the lens.

5. An image signal processing method for subjecting to processing an image signal from a solid state image sensor having a plurality of effective pixels and a plurality of light shielded pixels, comprising:
- an averaging step of calculating and outputting average values of signals from the light shielded pixels and holding the calculated average values;
- an adding step for superimposing a set threshold value, for determining whether a signal from the light shielded pixel is at an abnormal level or not, on the average values held in the averaging step, and for outputting a signal of a level based on a result of the adding step;
- a comparing step of comparing the level of the signal outputted in the adding step with the level of signals from the light shielded pixels; and
- a clamping step of adjusting signals from the light shielded pixels to a predetermined level in accordance with the average value calculated in the averaging step, wherein the average values held in the averaging step are then selectively supplied in the averaging step, instead of signals from the light shielded pixels used for the averaging step, in accordance with a comparison result in the comparing step, and wherein, when the difference between the average value held by the averaging step and the level of signals from the light shielded pixels is larger than the set threshold value as compared by the comparing step, the average value previously held by the averaging step is supplied to the averaging step instead of the signals from the light shielded pixels, and the signals from the light shielded pixels are provided to the average step instead of the average value previously held by the averaging step when the difference between the average value held by the averaging step and the level of signals from the light shielded pixels is smaller than the set threshold value as a result of comparison by the comparing step.

* * * * *